Aug. 13, 1935.  L. L. NAKASHIAN  2,010,925
AUTOMATIC POWER COUPLING AND CUT-OFF
Filed June 4, 1932
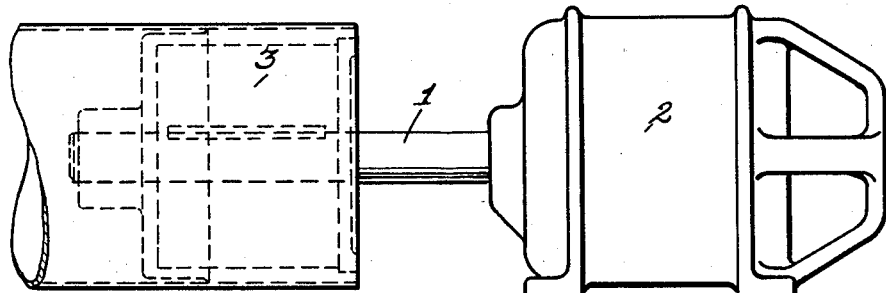
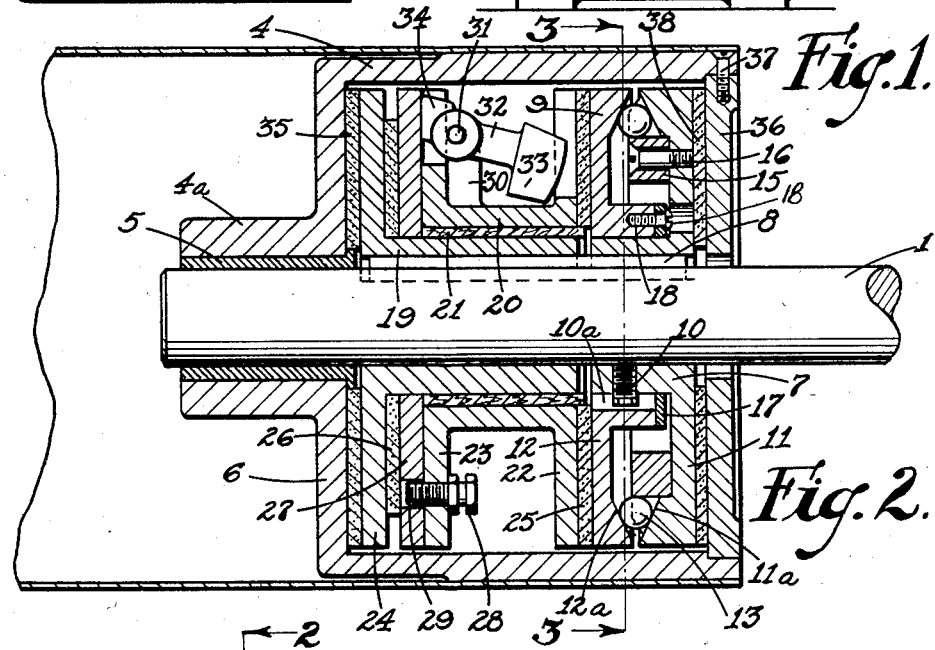
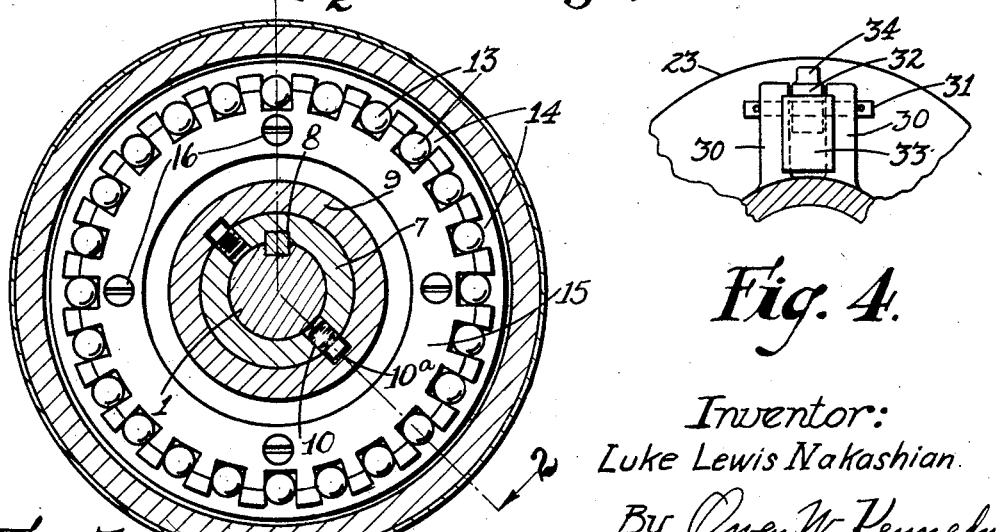
Inventor:
Luke Lewis Nakashian.
By Owen W. Kennedy
Attorney.

Patented Aug. 13, 1935

2,010,925

UNITED STATES PATENT OFFICE 2,010,925

AUTOMATIC POWER COUPLING AND CUT-OFF

Luke Lewis Nakashian, Worcester, Mass.

Application June 4, 1932, Serial No. 615,364

3 Claims. (Cl. 192—105)

The present invention relates to a power transmitting coupling that is adapted to automatically connect rotatable driving and driven elements for the transmission of power therebetween, after the driving element has attained its normal operating speed and to disconnect said elements when the driving element ceases to have power applied thereto.

Power couplings of the above indicated character are necessary under many conditions of operation, as for example, when an electric motor is employed to drive a load requiring a heavy starting torque considerably in excess of the power rating of the motor, and the main function of my coupling is to prevent any appreciable load being placed on the motor until it has attained its normal operating speed. According to the present invention, there is provided an improved coupling in which the driving and driven elements are entirely disconnected from each other until the driving element has been accelerated to practically its full speed and the prime mover is developing full power. In operation, the coupling first depends upon centrifugal force developed by rotation of the driving element to impart rotation to a floating element normally disconnected from both the driving and driven elements, centrifugal force developed by rotation of this floating element finally resulting in clutching the driven element to the driving element after the prime mover has reached full speed. The above and other advantageous features of the invention will hereinafter more fully appear from the following description with reference to the accompanying drawing, in which:—

Fig. 1 is a view in side elevation of a coupling embodying the invention.

Fig. 2 is a longitudinal sectional view of a portion of the parts shown in Fig. 1, on an enlarged scale.

Fig. 3 is a vertical sectional view along the line 3—3 of Fig. 2, looking in the direction of the arrows.

Fig. 4 is a fragmentary view of a portion of the floating element.

Like reference characters refer to like parts in the different figures.

Referring to the drawing, the driving element is represented by a rotatable shaft 1 to which power is applied in any suitable manner from a prime mover, such as an electric motor 2, the shaft 1 being connected to the motor either directly, or by gearing. The driven element is generally designated by the reference character 3, and in the present illustrative embodiment of the invention is shown as comprising a cylindrical drum 4, to which is connected a load requiring a high starting torque. The drum 4 provides a hub portion 4a rotatable on a bushing 5 surrounding the shaft 1, with an annular flange 6 connecting the hub 4a to its surrounding drum 4 and being concentric therewith.

The driving shaft 1 is surrounded by a sleeve 7 secured to the shaft 1 by a key 8, and a second sleeve 9 is mounted for rotation with the sleeve 7 by means of studs 10 projecting from sleeve 7 received in the slots 10a in sleeve 9, with the outer sleeve 9 being capable of axial movement on the inner sleeve 7. The sleeves 7 and 9 provide radial flanges 11 and 12 respectively, the outer portions of the flanges 11 and 12 having oppositely beveled faces 11a and 12a, between which is confined a set of balls 13. As best shown in Fig. 3, the balls 13 are received in notches 14 provided around the periphery of an annular cage 15 secured to the flange 11 by screws 16. The sleeves 7 and 9, with the interposed balls 13 and cage 15, are assembled as a unit, with the outer sleeve 9 held against removal from the inner sleeve 7 by means of a retaining ring 17 secured to the inner end of sleeve 9 by screws 18, the ring 17 being adapted to engage the ends of the studs 10 in the slots 10a.

A second sleeve 19 is mounted to turn with the shaft 1 by means of the key 8, although also adapted for axial movement on the key, and a floating sleeve 20 is rotatably supported on the sleeve 19 by means of a bushing 21. The floating sleeve 20 provides spaced annular flanges 22 and 23, with the flange 22 opposed to the flange 12 of the slidable sleeve 9, and the flange 23 opposed to a flange 24 formed integrally with the sleeve 19 that is keyed to the shaft 1. An annular disk 25 of frictional material is interposed between the flanges 12 and 22, while a similar disk 26 of frictional material is interposed between the flange 24 and a pressure plate 27 freely mounted between the flange 23 and the disk 26, although constrained to rotate with the floating sleeve 20 by means of a stud 28 threaded into the flange 23 and loosely received in an opening 29 of plate 27.

As best shown in Fig. 4, the flange 23 of the floating sleeve 20 provides around its outer periphery a number of pairs of lugs 30, with a pin 31 extending between each pair of lugs 30 for pivotally supporting a lever 32. One end of each lever provides a weighted portion 33, so that with the floating sleeve 20 stationary, the lever 32 is in the position shown in Fig. 2. Each lever 32 provides a cam portion 34 opposite to the weighted portion 33, and rotation of the floating sleeve 20 will cause centrifugal force to throw the weighted portions 33 of the levers 32 outwardly, and thereby cause the cam portions 34 that are in engagement with the pressure plate 27 to shift the plate bodily.

The flange 24 of the sleeve 19 on the shaft 1 is also opposed by the flange 6 connecting the drum 4 to the hub 4a, with an annular disk 35 of frictional material between these flanges. The drum 4 carries at its end opposite to the flange 6 a removable flange plate 36 secured to the drum 4 by screws 37, and a fourth annular disk 38 of frictional material is interposed between the flange plate 36 and the outer face of the flange 11 on the sleeve 7. The fact that the flange plate 36 is removable from the drum 4 permits the driving shaft 1, with the sleeves 7 and 19 assembled thereon, to be positioned within the drum 4, with the disks 35 and 38 located beyond the flanges 24 and 11 respectively, assembly of the coupling being completed by securing the flange plate 36 in position. With all the parts assembled as shown in Fig. 2, and with the shaft 1 stationary, it is obvious that the sleeve 20 carrying the weighted levers 32 is in effect floating freely between the fixed flange 24 on the sleeve 19 and the movable flange 12 on the sleeve 9, and the manner in which the floating sleeve 20 is first picked up by the shaft 1 and then caused to establish a full driving connection between the shaft 1 and the driven element 3 will next be described.

With the driving shaft 1 stationary, the set of balls 13 are in the position shown in Fig. 2, with their peripheries engaging the opposed beveled faces 11a and 12a of the sleeves 7 and 9. Therefore, when the motor 2 starts, the shaft 1 rotates freely within the stationary drum 4, the floating sleeve 20 being stationary also. As the motor speeds up, the balls 13 tend to move outwardly from the shaft 1, due to the centrifugal force developed by rotation of the balls with the sleeve 7 that is keyed to the shaft 1. As the balls 13 move outwardly, they exert a force tending to move the slidable sleeve 9 to the left, as viewed in Fig. 2, due to the cooperation between the balls and the beveled faces 11a and 12a. This shifting movement of the sleeve 9 causes its flange 12 to exert a pressure on the surface of the friction disk 25 between the flange 12 and the flange 22 of the floating sleeve 20, so that by the time the motor approaches its full speed, the floating sleeve 20 starts to rotate with the shiftable sleeve 9.

Rotation of the sleeve 30 causes the weighted portions 33 of the levers 32 to move outwardly away from the shaft 1 under the influence of centrifugal force, and the resulting turning movement of the levers 32 causes the cam portions 34 to exert a pressure on the plate 27 tending to move it in the direction of the flange 24 of the sleeve 19 that is slidably keyed to the shaft 1, so that the sleeve 20 tends to rotate with the shaft driven sleeve 19, as the disk 26 takes hold. As the pressure exerted by the levers 32 on the plate 27 increases, due to increased speed of the sleeve 20, and the sleeve 19 shifts to the left under this pressure the friction disks 35 and 38 so pressed in engagement with the flanges 6 and 36 of the drum 4 finally cause rotation of the drum 4 with the shaft 1 at about the time the motor 2 has attained its full speed. As a result, the drum 4 carrying the load is not fully connected to the driving shaft 1 until the motor has attained a speed at which its full power is developed, which has the effect of limiting the starting current of the motor to a normal value, and of reducing strains and shocks on both the motor and the load.

Upon shutting off power to the motor 2, the resulting slowing down of the shaft 1 immediately results in the balls 13 tending to move inwardly toward the axis of the shaft 1, while the weighted portions 33 of the levers 32 move inwardly to release the pressure of the cam portions 34 on the plate 27. As a result, the shaft 1 is completely disconnected from the load almost as soon as power is shut off, thereby reducing over-running of the load to a minimum.

From the foregoing, it is apparent that by the present invention there is provided an improved power coupling and cut-off which is entirely automatic in its operation to connect the driving element to the load, only when the prime mover has attained substantially its operating speed.

I claim:

1. In a device of the class described, the combination with a rotatably driven shaft, a drum freely rotatable on said shaft and connected to a load, a pair of sleeves mounted to rotate with said shaft, with one of said sleeves capable of movement axially of the other sleeve, a floating sleeve freely mounted for rotation about the axis of said shaft and frictional clutching members disposed between opposed portions of said sleeves and said drum as well as between opposed portions of said floating sleeve and of said other sleeves, of members responsive to centrifugal force developed by the rotation of said shaft for causing axial movement of one of the sleeves carried thereby to impart rotation to said floating sleeve through certain of said clutching members, and members responsive to centrifugal force developed by the rotation of said floating sleeve to cause engagement of other of said clutching members to impart rotation to said drum.

2. In a device of the class described, the combination with a rotatably driven shaft, a drum freely rotatable on said shaft and connected to a load, a pair of sleeves mounted to rotate with said shaft, with one of said sleeves capable of movement axially on the other sleeve, a floating sleeve freely mounted for rotation about the axis of said shaft, and frictional clutching members disposed between opposed portions of said sleeves and said drum, as well as between opposed portions of said floating sleeve and of said other sleeves of a series of members enclosed between opposed portions of said rotatably driven sleeves for causing axial movement of one of said sleeves in response to centrifugal force developed by rotation of said members with said shaft and thereby impart rotation to said floating sleeve through certain of said clutching members, and pivotally mounted members carried by said floating sleeve and responsive to centrifugal force developed by the rotation thereof to cause engagement of other of said clutching members for imparting rotation to said drum.

3. In a device of the class described, the combination with a rotatably driven shaft, a drum freely rotatable on said shaft and connected to a load, a pair of sleeves mounted to rotate with said shaft, with one of said sleeves capable of movement axially of the other sleeve, a third sleeve slidably keyed to said shaft, a floating sleeve freely mounted on said third sleeve, and frictional clutching members disposed between opposed portions of said sleeves and said drum, as well as between opposed portions of said floating sleeve and of said other sleeves of members responsive to centrifugal force developed by the rotation of said shaft for causing axial movement of one of said pair of sleeves and thereby impart rotation to said floating sleeve through certain of said clutching members and members pivotally mounted on said floating sleeve responsive to centrifugal force developed by the rotation thereof for causing engagement of other of said clutching members between said floating sleeve and said third sleeve and between said third sleeve and said drum.

LUKE LEWIS NAKASHIAN.